United States Patent
Ikeda (10) Patent No.: US 9,347,422 B2
(45) Date of Patent: May 24, 2016

(54) PLASMA GENERATION DEVICE

(75) Inventor: Yuji Ikeda, Kobe (JP)

(73) Assignee: IMAGINEERING, INC., Kyogo (JP)

(*) Notice: Subject to any disclaimer, the term of this patent is extended or adjusted under 35 U.S.C. 154(b) by 477 days.

(21) Appl. No.: 13/982,674

(22) PCT Filed: Jan. 31, 2012

(86) PCT No.: PCT/JP2012/052169
§ 371 (c)(1),
(2), (4) Date: Oct. 14, 2013

(87) PCT Pub. No.: WO2012/105569
PCT Pub. Date: Aug. 9, 2012

(65) Prior Publication Data
US 2014/0048030 A1    Feb. 20, 2014

(30) Foreign Application Priority Data
Jan. 31, 2011  (JP) .................................. 2011-019159

(51) Int. Cl.
*F02P 23/04*  (2006.01)
*F02M 27/04*  (2006.01)
(Continued)

(52) U.S. Cl.
CPC ........... *F02P 23/045* (2013.01); *F02B 23/0624* (2013.01); *F02M 27/042* (2013.01);
(Continued)

(58) Field of Classification Search
CPC ......... F02P 23/045; F02P 9/007; F02P 15/08; F02P 15/12; F02M 27/042; F02M 2027/047; F02M 61/1806; F02F 1/242; H05H 2001/463; H05H 1/04; F02D 7/00; F02B 23/08; F02B 23/0624; F02B 23/0645; F02B 23/0669; F02B 2023/108
USPC ....... 123/301, 536, 149 F, 169 R, 143 B, 620, 123/298; 313/231.31
See application file for complete search history.

(56) References Cited
U.S. PATENT DOCUMENTS

| | | | | |
|---|---|---|---|---|
| 8,365,707 B2* | 2/2013 | Ikeda | ...................... | F02B 23/08 123/536 |
| 8,485,162 B2* | 7/2013 | Ikeda | ........................ | F01L 3/02 123/536 |
| 8,820,285 B2* | 9/2014 | Kaneko | ................... | F02P 9/007 123/143 B |
| 2010/0180871 A1* | 7/2010 | Ikeda | ...................... | F02B 23/08 123/536 |

(Continued)

FOREIGN PATENT DOCUMENTS

EP    2180172 A1    4/2010
EP    2180177 A1    4/2010
(Continued)

OTHER PUBLICATIONS

International Search Report of PCT/JP2012/052169, mailing date of Jul. 24, 2012.

*Primary Examiner* — Lindsay Low
*Assistant Examiner* — George Jin
(74) *Attorney, Agent, or Firm* — Westerman, Hattori, Daniels & Adrian, LLP (57) ABSTRACT

In an plasma generation device 30 that generates electromagnetic wave plasma by emitting electromagnetic waves to a combustion chamber 21 of an internal combustion engine 20, combustion is promoted by increasing the amount of gas to be brought into contact with the electromagnetic wave plasma in the combustion chamber 21. An antenna 36 extends along a ceiling surface of the combustion chamber 21. The antenna 36 is provided with an adjustment unit 37 that changes the location of a strong electric field on the antenna 36, which is supplied with the electromagnetic wave. During a generation period of the electromagnetic wave plasma, a control device 10 controls the adjustment unit 37 based on a condition of the combustion chamber 21 and changes the location of the electromagnetic wave plasma.

13 Claims, 6 Drawing Sheets

(51) Int. Cl.
  *F02B 23/06* (2006.01)
  *F02P 9/00* (2006.01)
  *F02F 1/24* (2006.01)
  *H05H 1/46* (2006.01)
  *F02B 23/10* (2006.01)
  *F02P 3/04* (2006.01)
  *F02P 7/02* (2006.01)
  *F02P 11/00* (2006.01)
  *F02P 15/08* (2006.01)

(52) U.S. Cl.
  CPC ............ *F02P 9/007* (2013.01); *F02B 23/0645* (2013.01); *F02B 23/0669* (2013.01); *F02B 2023/108* (2013.01); *F02F 1/242* (2013.01); *F02P 3/0407* (2013.01); *F02P 7/02* (2013.01); *F02P 11/00* (2013.01); *F02P 15/08* (2013.01); *H05H 2001/463* (2013.01)

(56) References Cited

U.S. PATENT DOCUMENTS

| | | | | |
|---|---|---|---|---|
| 2010/0192909 | A1* | 8/2010 | Ikeda | F02D 41/402 123/436 |
| 2011/0030347 | A1* | 2/2011 | Ikeda | F01L 3/02 60/275 |
| 2011/0030660 | A1* | 2/2011 | Ikeda | F02B 1/02 123/536 |
| 2012/0239274 | A1* | 9/2012 | Ikeda | F02B 1/12 701/102 |
| 2014/0014050 | A1* | 1/2014 | Ikeda | F02P 9/007 123/3 |

FOREIGN PATENT DOCUMENTS

| | | |
|---|---|---|
| EP | 2264308 A1 | 12/2010 |
| JP | 2009-036200 A | 2/2009 |
| WO | 2009/008521 A1 | 1/2009 |
| WO | 2009/113693 A1 | 9/2009 |

\* cited by examiner

PLASMA GENERATION DEVICE

TECHNICAL FIELD

The present invention relates to a plasma generation device that generates electromagnetic wave plasma by emitting electromagnetic waves to a combustion chamber of an internal combustion engine.

BACKGROUND ART

Conventionally, there is known a plasma generation device that generates electromagnetic wave plasma by emitting electromagnetic waves to a combustion chamber of an internal combustion engine. For example, Japanese Unexamined Patent Application, Publication No. 2009-36200 discloses a plasma generation device of this kind.

More particularly, Japanese Unexamined Patent Application, Publication No. 2009-36200 discloses an internal combustion engine in which microwave plasma is generated by way of microwaves. In the internal combustion engine, discharge plasma formed by a discharge electrode of a spark plug is irradiated with electromagnetic waves from an electromagnetic wave radiator (antenna), and the discharge plasma grows and expands. The internal combustion engine is an internal EGR (Exhaust Gas Recirculation) type internal combustion engine, in which residual gas components are subject to a plasma process immediately before intake stroke.

DISCLOSURE OF THE INVENTION

Problems to be Solved by the Invention

In a conventional plasma generation device, the electromagnetic wave plasma is generated only in a fixed location. Therefore, it is difficult to cause the electromagnetic wave plasma to sufficiently contact with gas in the combustion chamber.

The present invention has been made in view of the above described circumstances, and it is an object of the present invention, in a plasma generation device that generates electromagnetic wave plasma by emitting electromagnetic waves to a combustion chamber of an internal combustion engine, to promote combustion by increasing contact of the electromagnetic wave plasma with gas in the combustion chamber.

Means for Solving the Problems

In accordance with a first aspect of the present invention, there is provided a plasma generation device, including: an electromagnetic wave generator that generates electromagnetic waves to be emitted to a combustion chamber of an internal combustion engine; an antenna for emitting the electromagnetic wave supplied from the electromagnetic wave generator to the combustion chamber; and a control unit that controls the electromagnetic wave generator based on an operating condition of the internal combustion engine, and generates electromagnetic wave plasma by the electromagnetic wave emitted to the combustion chamber from the antenna, wherein the antenna extends along a ceiling surface or a wall surface of the combustion chamber, and includes an adjustment unit that changes a location of a strong electric field, which has relatively strong electric field intensity, on a surface of the antenna, which is supplied with the electromagnetic wave, and the control unit changes a location of the electromagnetic wave plasma by controlling the adjustment unit during a generation period of the electromagnetic wave plasma.

According to the first aspect of the present invention, the antenna, from the location of which the electromagnetic wave is emitted, extends along the ceiling surface or the wall surface of the combustion chamber. In the plasma generation device, the adjustment unit is controlled during the generation period of the electromagnetic wave plasma. Then, the location of the strong electric field is changed on the surface of the antenna, which is supplied with the electromagnetic wave, and the location of the electromagnetic wave plasma is changed.

In accordance with a second aspect of the present invention, in addition to the first aspect of the present invention, the internal combustion engine includes an injector that injects fuel to the combustion chamber, and the control unit generates the electromagnetic wave plasma at a time of injection of fuel from the injector and controls the adjustment unit based on a diffusion condition of a jet flow injected from the injector during the generation period of the electromagnetic wave plasma.

According to the second aspect of the present invention, electromagnetic wave plasma is generated when the injector injects fuel. During the generation period of the electromagnetic wave plasma, the adjustment unit is controlled based on the diffusion condition of the jet flow injected from the injector, and the location of the electromagnetic wave plasma is changed.

In accordance with a third aspect of the present invention, in addition to the first aspect of the present invention, fuel air mixture is forcibly ignited and a propagation flame is formed in the combustion chamber of the internal combustion engine, and the control unit generates the electromagnetic wave plasma while the propagation flame is being formed and controls the adjustment unit based on a condition of the propagation flame during the generation period of the electromagnetic wave plasma.

According to the third aspect of the present invention, the electromagnetic wave plasma is generated while the propagation flame is being formed. During the generation period of the electromagnetic wave plasma, the adjustment unit is controlled based on the condition of the propagation flame, and the location of the electromagnetic wave plasma is changed.

In accordance with a fourth aspect of the present invention, there is provided a plasma generation device including: an electromagnetic wave generator that generates electromagnetic waves to be emitted to a combustion chamber of an internal combustion engine; an antenna for emitting the electromagnetic wave supplied from the electromagnetic wave generator to the combustion chamber; and a control unit that controls the electromagnetic wave generator based on an operating condition of the internal combustion engine, and generates electromagnetic wave plasma by way of the electromagnetic wave emitted to the combustion chamber from the antenna, wherein a plurality of the antennae are provided on a ceiling surface or a wall surface of the combustion chamber, and
the control unit changes a location of the electromagnetic wave plasma by switching the antenna to be supplied with the electromagnetic wave during a generation period of the electromagnetic wave plasma.

According to the fourth aspect of the present invention, a plurality of the antennae for emitting the electromagnetic wave are provided on the ceiling surface or the wall surface of the combustion chamber. In the plasma generation device, during the generation period of the electromagnetic wave plasma, the antenna to be supplied with the electromagnetic wave is switched, in accordance with which the location of the electromagnetic wave plasma is changed.

In accordance with a fifth aspect of the present invention, in addition to the fourth aspect of the present invention, the internal combustion engine includes an injector that injects fuel to the combustion chamber, and the plurality of antennae are arrayed along an injection direction of fuel from an injection hole of the injector.

According to the fifth aspect of the present invention, the plurality of antennae are arrayed along an injection direction of fuel from the injection hole of the injector. Therefore, it is possible to change the location to generate the electromagnetic wave plasma in accordance with diffusion of fuel injected from the injection hole.

In accordance with a sixth aspect of the present invention, in addition to the fifth aspect of the present invention, a swirl is formed in the combustion chamber, and the plurality of antennae are arrayed at locations each displaced in a direction of the swirl from a line extending straightforward in an injection direction from an injection hole of the injector.

According to the sixth aspect of the present invention, the plurality of antennae are arrayed at locations each displaced in the swirl direction from the line extending straightforward in the injection direction from an injection hole of the injector. The locations of the plurality of antennae are determined in view of the swirl direction.

In accordance with a seventh aspect of the present invention, in addition to the fifth aspect of the present invention, the control unit changes the number of pieces of the electromagnetic wave plasma to be brought into contact with a jet flow injected from the injection hole based on an injection condition of fuel from the injector during the generation period of the electromagnetic wave plasma.

According to the seventh aspect of the present invention, based on the injection condition (such as injection flow rate and injection pressure) of fuel from the injector, the number of pieces of the electromagnetic wave plasma to be brought into contact with the jet flow injected from each injection hole is changed. For example, as the injection flow rate increases, the number of pieces of the electromagnetic wave plasma to be brought into contact with the jet flow is increased.

In accordance with an eighth aspect of the present invention, in addition to the second and fifth aspects of the present invention, the control unit causes to change an amount of energy of the electromagnetic wave outputted from the electromagnetic wave generator in response to a change of injection quantity of fuel from the injector during a transient operation of the internal combustion engine.

According to the eighth aspect of the present invention, during the transient operation of the internal combustion engine, the amount of energy of the electromagnetic wave outputted from the electromagnetic wave generator changes in response to the change of the injection quantity of fuel from the injector.

In accordance with a ninth aspect of the present invention, there is provided a plasma generation device including: an electromagnetic wave generator that generates electromagnetic waves to be emitted to a combustion chamber of an internal combustion engine; an antenna for emitting the electromagnetic wave supplied from the electromagnetic wave generator to the combustion chamber; and a control unit that controls the electromagnetic wave generator based on an operating condition of the internal combustion engine, and generates electromagnetic wave plasma by way of the electromagnetic wave emitted to the combustion chamber from the antenna, wherein the antenna includes an adjustment unit that changes a location of the electromagnetic wave plasma during a generation period of the electromagnetic wave plasma by forcibly changing a wavelength of the electromagnetic wave emitted from the antenna.

According to the ninth aspect of the present invention, the wavelength of the electromagnetic wave emitted from the antenna is forcibly changed. As a result of this, the location of a strong electric field is changed in the combustion chamber, and the location of the electromagnetic wave plasma is changed.

In accordance with a tenth aspect of the present invention, in addition to the ninth aspect of the present invention, the adjustment unit is configured to be variable in shape, and is a covering member that covers a part of a surface of the antenna, and the plasma generation device changes a surface resistance of the antenna by changing a shape of the covering member during the generation period of the electromagnetic wave plasma, thereby forcibly changing a wavelength of the electromagnetic wave emitted from the antenna.

According to the tenth aspect of the present invention, during the generation period of the electromagnetic wave plasma, the shape of the covering member is changed, and the surface resistance of the antenna is changed. As a result of this, the wavelength of the electromagnetic wave emitted from the antenna is changed, the location of the strong electric field is changed in the combustion chamber, and the location of the electromagnetic wave plasma is changed.

In accordance with an eleventh aspect of the present invention, in addition to any one of the first to tenth aspects of the present invention, the plasma generation device moves the plasma in a direction opposite to a direction of a gas flow in the combustion chamber during the generation period of the electromagnetic wave plasma.

According to the eleventh aspect of the present invention, since the plasma is moved in the direction opposite to the direction of the gas flow in the combustion chamber, fuel air mixture and plasma are accelerated to be brought into contact with each other.

In accordance with a twelfth aspect of the present invention, in addition to any one of the first to eleventh aspects of the present invention, the plasma generation device further includes an electron discharge unit that forcibly causes a discharge of free electrons in the combustion chamber, wherein the antenna emits electromagnetic waves while the discharge of free electrons is being forcibly caused by the electron discharge unit, thereby generating the electromagnetic wave plasma.

According to the twelfth aspect of the present invention, the free electrons forcibly discharged by the electron discharge unit are accelerated by the energy of the electromagnetic wave, and the electromagnetic wave plasma is thereby generated. The forcibly discharged free electrons cause the electromagnetic wave plasma.

Effect of the Invention

According to the first aspect of the present invention, during the generation period of the electromagnetic wave plasma, the adjustment unit is controlled to change the location of the electromagnetic wave plasma. Therefore, in comparison with a case in which the electromagnetic wave plasma is generated in a fixed location, the amount of gas to be is brought into contact with the electromagnetic wave plasma in the combustion chamber is increased, and it becomes possible to promote combustion.

Furthermore, according to the fourth aspect of the present invention, the plasma generation device changes the location of the electromagnetic wave plasma by switching the antenna to be supplied with the electromagnetic wave during the generation period of the electromagnetic wave plasma. Therefore, in comparison with a case in which the electromagnetic wave plasma is generated in a fixed location, the amount of gas to be brought into contact with the electromagnetic wave plasma in the combustion chamber increases, and it becomes possible to promote combustion.

Furthermore, according to the ninth aspect of the present invention, the plasma generation device changes the location of the electromagnetic wave plasma by forcibly changing the wavelength of the electromagnetic wave during the generation period of the electromagnetic wave plasma. Therefore, in comparison with a case in which the electromagnetic wave plasma is generated in a fixed location, the amount of gas to be brought into contact with the electromagnetic wave plasma in the combustion chamber increases, and it becomes possible to promote combustion.

BEST MODE FOR CARRYING OUT THE INVENTION

In the following, a detailed description will be given of the embodiments of the present invention with reference to drawings. It should be noted that the following embodiments are mere examples that are essentially preferable, and are not intended to limit the scope of the present invention, applied field thereof, or application thereof.

First Embodiment

Figure 1:
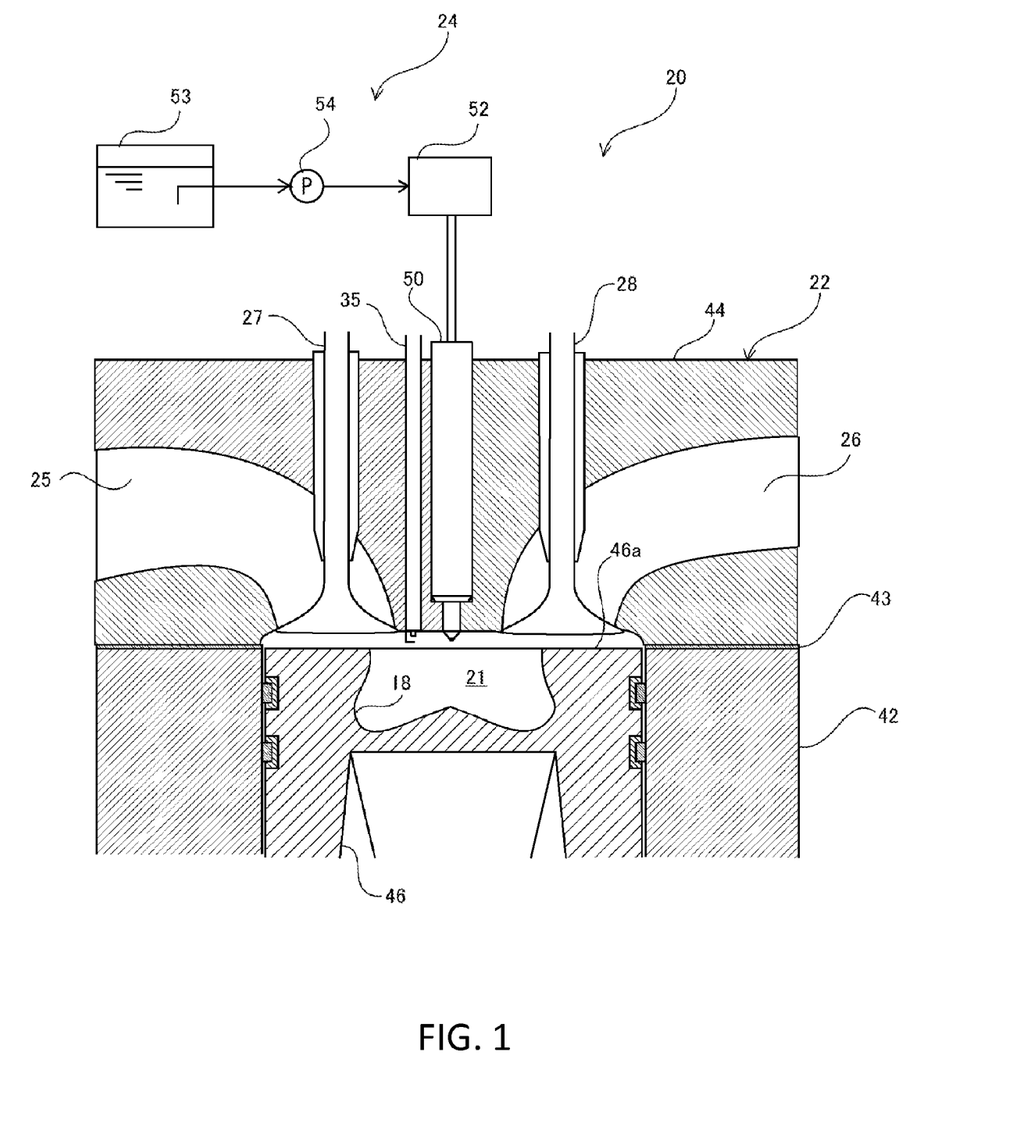
FIG. 1 is a vertical cross section view of an internal combustion engine according to a first embodiment.

The first embodiment is directed to an internal combustion engine 20 provided with a plasma generation device 30 according to the present invention. The internal combustion engine 20 is a diesel engine that executes compression ignition of fuel in a combustion chamber 21. The plasma generation device 30 utilizes microwave plasma to promote combustion in the combustion chamber 21. Firstly, the internal combustion engine 20 will be described hereinafter before the plasma generation device 30 is described in detail.
<Internal Combustion Engine>
As shown in FIG. 1, the internal combustion engine 20 is provided with an internal combustion engine main body 22 and a fuel injection device 24.

The internal combustion engine main body 22 is provided with a cylinder block 42, a cylinder head 44, and pistons 46. The cylinder block 42 is formed with a plurality of cylinders 48 each having a circular cross section. Inside of each cylinder 48, the piston 46 is reciprocatably fitted. The piston 46 is connected to a crankshaft (not shown) via a connecting rod (not shown). The crankshaft is rotatably supported by the cylinder block 42. While the piston 46 reciprocates in each cylinder 48 in an axial direction of the cylinder 48, the connecting rod converts the reciprocal movement of the piston 46 to rotational movement of the crankshaft.

The cylinder head 44 is placed on the cylinder block 42, and a gasket 43 intervenes between the cylinder block 42 and the cylinder head 44. The cylinder head 44 partitions the combustion chamber 21 along with the cylinder 48 and the piston 46. A surface of the cylinder head 44, which is exposed toward the combustion chamber 21, constitutes a ceiling surface of the combustion chamber 21. An inner peripheral surface of the cylinder 48, which is exposed toward the combustion chamber 21, constitutes a wall surface of the combustion chamber 21.

The cylinder head 44 is provided with one injector 50 for each cylinder 48. The injector 50 is arranged at a center of the ceiling surface of the combustion chamber 21. Details of the injector 50 will be described later.

The cylinder head 44 is formed with an intake port 25 and an exhaust port 26 for each cylinder 48. The intake port 25 is provided with an intake valve 27 for opening and closing the intake port 25. The intake port 25 is configured so as to create a swirl in the combustion chamber 21. On the other hand, the exhaust port 26 is provided with an exhaust valve 28 for opening and closing the exhaust port 26.

On the top surface of the piston 46, a cavity part 18 is formed to form the combustion chamber 21. The cavity part 18 has an opening part in a circular shape. An inner peripheral surface of the cavity part 18 swells toward outside from a circumference of the opening part. A center of the opening part coincides with an axial center of the piston 46. A bottom surface of the cavity part 18 is a circular cone protruding toward the direction of the cylinder head 44.

The fuel injection device 24 is fixed to the internal combustion engine main body 22, and is adapted to inject fuel to the combustion chamber 21. The fuel injection device 24 is a common rail type fuel injection device, and is adapted to execute a multiple injection of a pilot injection, a pre-injection, a main injection, an after injection, and a post-injection for one combustion cycle.

As shown in FIG. 1, the fuel injection device 24 is provided with the injector 50 for each cylinder 48, an accumulator 52 that stores high pressure fuel to be supplied to each injector 50, and a supply pump 54 that pressurizes fuel in a fuel tank 53 and supplies it to the accumulator 52.

Figure 2:
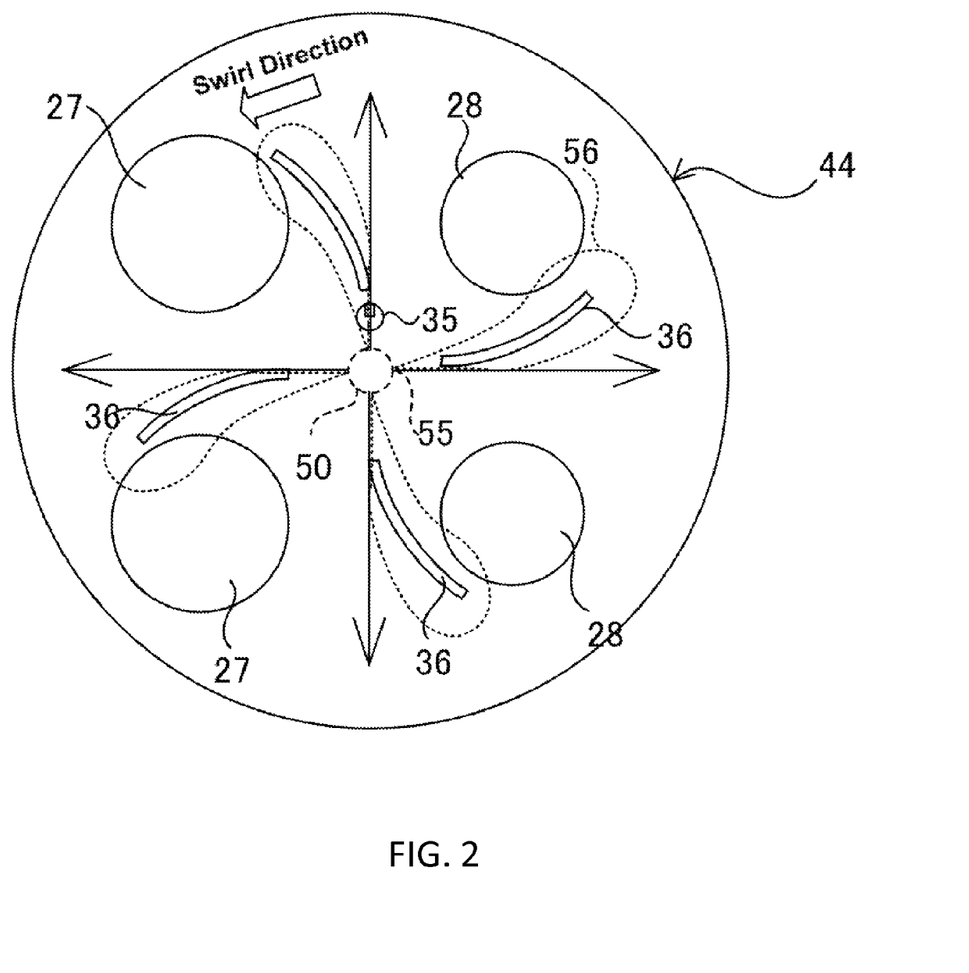
FIG. 2 is a front view of a ceiling surface of a combustion chamber of the internal combustion engine according to the first embodiment.

As shown in FIG. 2, the injector 50 includes a plurality (four in the first embodiment) of injection holes 55, from which fuel is injected to the combustion chamber 21. The plurality of injection holes 55 are equiangularly arranged centering on an axial center of the injector 50. The injector 50 radially injects fuel. An injection direction of each injection hole 55, toward which fuel is injected, is directed slightly downward (toward the direction of the piston 46) from horizontal. From each injection hole 55, fuel is injected into the cavity part 18. A jet flow injected from each injection hole 55 is bent due to the swirl.
<Plasma Generation Device>
While the injector 50 injects fuel, the plasma generation device 30 emits microwaves to the combustion chamber 21 and generates microwave plasma (electromagnetic wave plasma). One plasma generation device 30 is provided for each cylinder 48.

Figure 3:
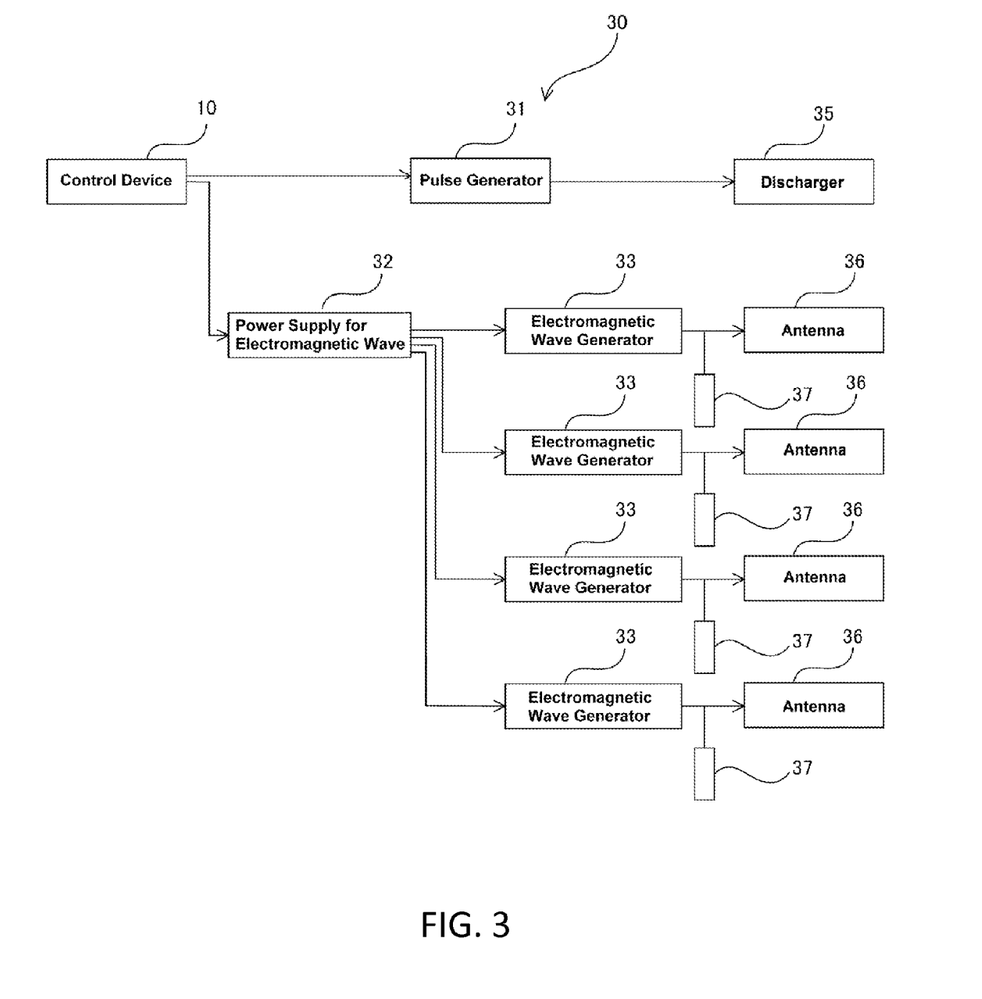
FIG. 3 is a schematic configuration diagram of a plasma generation device according to the first embodiment.

As shown in FIG. 3, each plasma generation device 30 is provided with a pulse generator 31, a discharger 35, a power supply for electromagnetic wave 32, an electromagnetic wave generator 33, an antenna 36, and a control device 10. The pulse generator 31 and the discharger 35 are paired with each other and one pair of the pulse generator 31 and the discharger 35 are provided for each plasma generation device 30. The electromagnetic wave generator 33 and the antenna 36 are paired with each other and the numbers of the electromagnetic wave generator 33 and the antenna 36 are equal to that of the injection holes of the injector 50.

The pulse generator 31 is connected to a direct current power supply (not shown). The pulse generator 31 may be, for example, an ignition coil. The pulse generator 31, upon receiving a discharge signal from the control device 10, boosts a voltage applied from the direct current power supply, and outputs the boosted high voltage pulse to the discharger 35.

The discharger 35 constitutes an electron discharge unit that forcibly causes a discharge of free electrons in the combustion chamber 21. The discharger 35 ionizes gas in the combustion chamber 21 to forcibly cause a discharge of free electrons. The discharger 35 may be, for example, a spark plug. The discharger 35 includes a discharge electrode that is electrically connected to the pulse generator 31, and a ground electrode that forms a discharge gap along with the discharge electrode. The discharge gap formed by the discharger 35 is located within the combustion chamber 21.

The power supply for electromagnetic wave 32 is connected to the direct current power supply. The power supply for electromagnetic wave 32 is provided with one pulse oscillation part for each electromagnetic wave generator 33. The pulse oscillation part converts a current from the direct current power supply into a pulse current and outputs it to the corresponding electromagnetic wave generator 33. In the power supply for electromagnetic wave 32, upon receiving an electromagnetic wave generation signal such as a TTL (Transistor-Transistor Logic) signal from the control device 10, each pulse oscillation part outputs a pulse current to each electromagnetic wave generator 33 for a predetermined time interval at a predetermined duty cycle.

The electromagnetic wave generator 33 may be, for example, a magnetron or a semiconductor oscillator. The electromagnetic wave generator 33, upon receiving the pulse current, outputs a microwave pulse to the corresponding antenna 36.

Each antenna 36 is disposed on the ceiling surface of the combustion chamber 21. As shown in FIG. 2, the antennae 36 are disposed for respective injection holes 55 of the injector 50. Each antenna 36 extends along the ceiling surface of the combustion chamber 21 from inside to outside through between two of the four openings of the intake ports 25 and the exhaust ports 26.

More particularly, viewing the ceiling surface of the combustion chamber 21 from below, each antenna 36 is located at a position where the jet flow 56 injected from each injection hole 55 passes through. Each antenna 36 extends along the injection direction from each injection hole 55 of the injector 50. An outer end of each antenna 36 is bent toward the swirl direction. A shape of each antenna 36 is determined in view of the swirl direction. In FIG. 2, the jet flow 56 injected from each injection hole 55 is bent toward a counterclockwise direction due to swirl, and diffuses along the antenna 36. On the ceiling surface of the combustion chamber 21, each antenna 36 extends along a passing region, which the jet flow 56 injected from each injection hole 55 of the injector 50 passes through.

According to the first embodiment, a stub 37 is attached to each transmission line for transmitting a microwave to each antenna 36. The stub 37 is adapted to change a location of a strong electric field, which is relatively strong in electric field intensity, on the antenna 36 while the antenna 36 is being supplied with the microwave. The stub 37 is connected to the transmission line, and is configured to be capable of changing an electrical length from a position at which the stub 27 is connected with the transmission line to a short-circuit position. The stub 37 constitutes an adjustment unit. The electrical length of the stub 37 is controlled by the control device 10. The control device 10 is adapted to change a location of the strong electric field on the antenna 36 while the antenna 36 is being supplied with the microwave, by changing the electrical length of the stub 37. Therefore, it is possible to change a location where the microwave plasma is generated on the antenna 36, which extends along the ceiling surface of the combustion chamber 21.

During the generation period of the microwave plasma, the control device 10 changes a location of the microwave plasma by controlling the stub 37 based on an operating condition (such as a condition of the combustion chamber 21) of the internal combustion engine 20. More particularly, the control device 10 controls the stub 37 based on a diffusion condition of the jet flow injected from the injector 50 during the generating period of the microwave plasma.

The operation of the plasma generation device 30 will be described hereinafter. The plasma generation device 30 performs a plasma generation operation for generating the microwave plasma under the control of the control device 10.

In the plasma generation operation, while each injection hole 55 of the injector 50 injects fuel for the main injection, the control device 10 simultaneously outputs a discharge signal to the pulse generator 31 and an electromagnetic wave generation signal to the power supply for electromagnetic wave 32. More precisely, the control device 10 outputs the electromagnetic wave generation signal slightly before the discharge signal.

In the power supply for electromagnetic wave 32, upon receiving the electromagnetic wave generation signal, each pulse oscillation part outputs a pulse current for a predetermined time interval (1 ms, for example) at a predetermined duty cycle. Each electromagnetic wave generator 33 outputs a microwave pulse for the predetermined time interval at the predetermined duty cycle. Each antenna 36 emits the microwave pulse outputted from each electromagnetic wave generator 33 to the combustion chamber 21.

Meanwhile, the pulse generator 31, upon receiving the discharge signal, outputs a high voltage pulse. The discharger 35, upon receiving the high voltage pulse from the pulse generator 31, causes a spark discharge at the discharge gap.

In the plasma generation operation, a start timing of emitting the microwave pulse to the combustion chamber 21 is before the spark discharge, and an end timing of emitting the microwave pulse to the combustion chamber 21 is after the spark discharge. The spark discharge occurs sometime during the emission period of the microwave pulse. In the emission period of the microwave pulse, a strong electric field, which has relatively strong electric field intensity in the combustion chamber 21, is formed in the vicinity of the antenna 36.

According to the first embodiment, since an outer end of each antenna 36 is connected to the transmission line of the electromagnetic wave, an inner end of each antenna 36 serves as a tip end of the antenna. In the plasma generation device 30, impedance matching is performed so that a reflected wave of the microwave may be reduced in intensity at a point of time of starting generation of the microwave plasma. In each antenna 36, a standing wave has an antinode at the inner end, where an electric field is relatively strong in intensity. At the strong electric field in the vicinity of the inner end of each antenna 36, free electrons forcibly discharged from gas molecules by the spark discharge are accelerated by the microwave pulse. The accelerated electrons collide with ambient molecules. The collision molecules are ionized and become plasma. Electrons in the plasma are also accelerated by the microwave pulse, and ambient molecules collide with the electrons and become plasma. In this manner, an avalanche-like plasma generation occurs in the strong electric field in the vicinity of the inner end of each antenna 36, and comparatively large microwave plasma is generated.

Starting from this state, according to the first embodiment, the control device 10 changes the electrical length of the stub 37 corresponding to each antenna 36, thereby displacing the location of the strong electric field from the inner end toward the outer end of each antenna 36. Then, along with the displacement of the strong electric field, the microwave plasma is moved along each antenna 36 from the inner end toward the outer end. The microwave plasma is moved toward outside along with the diffusion of the jet flow 56.

Subsequently, when the predetermined time interval has elapsed since the point of time when the electromagnetic wave generation signal rises, the microwave pulse generation is terminated, and the microwave plasma disappears. The time interval is configured so that the microwave plasma should be maintained until a tail part of the jet flow 56 injected from each injection hole 55 of the injector 50 has passed through the outer end of the antenna 36.

Effect of First Embodiment

According to the first embodiment, during the generation period of the microwave plasma, the control device 10 changes the location of the microwave plasma by controlling the stub 37 based on the operating condition of the internal combustion engine 20. The microwave plasma is moved in accordance with the diffusion of the jet flow 56. Therefore, it is possible to increase the amount of gas (evaporated fuel) brought into contact with the microwave plasma in the combustion chamber 21, and thus promote combustion.

Modified Example of First Embodiment

According to the present modified example, during a transient operation of the internal combustion engine 20, the control device 10 changes the amount of energy of the electromagnetic wave outputted from the electromagnetic wave generator 33 in response to a change in injection quantity of fuel from the injector 50.

The control device 10 controls the amount of energy per unit time of the microwave by changing duty cycle of the microwave pulse. In a case in which the amount of energy per unit time of the microwave is required to be increased, the duty cycle of the microwave pulse is set to a large value. Also, the control device 10 may control the amount of energy per unit time of the microwave by changing a peak current value of the microwave. Furthermore, the control device 10 may control the amount of energy of the microwave during a predetermined period by changing a duration time of the microwave pulse.

During the transient operation of the internal combustion engine 20, as fuel injection quantity from the injector 50 increases, the control device 10 increases the amount of energy of the microwave outputted by the electromagnetic wave generator 33. Accordingly, it is possible to suppress occurrence of unburned fuel and emission of soot and SOF (Soluble Organic Fraction) accompanied with the soot.

Second Embodiment

Figure 4:
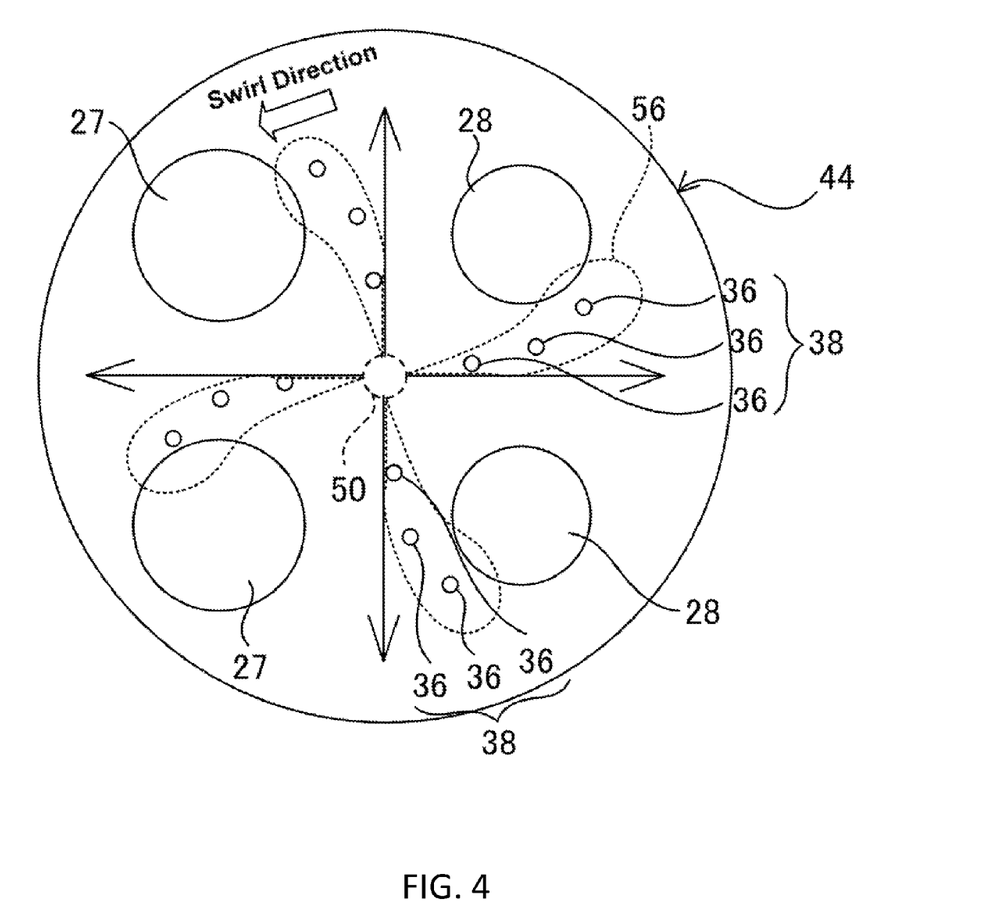
FIG. 4 is a front view of a ceiling surface of a combustion chamber of the internal combustion engine according to a second embodiment.

The following description is directed to the second embodiment. As shown in FIG. 4, according to the second embodiment, an antenna group 38 including a plurality (three antennae in the second embodiment) of antennae 36 is provided for each injection hole 55 of the injector 50. This means that a plurality of antenna groups 38 are provided on the ceiling surface of the combustion chamber 21. The number of the antenna groups 38 is the same as that of the injection holes 55 of the injector 50.

In each antenna group 38, a plurality of antennae 36 are arrayed along an injection direction of fuel from each injection hole 55 of the injector 50. The plurality of antennae 36 are arranged at locations each displaced in a swirl direction from a line extending straightforward in an injection direction from an injection hole 55 of the injector 50. The antennae 36 are arranged in such a manner that each of antennae 36 is bent more sharply toward a direction of the swirl as distance thereof from the corresponding injection hole 55 of the injector 50 increase.

Figure 5:
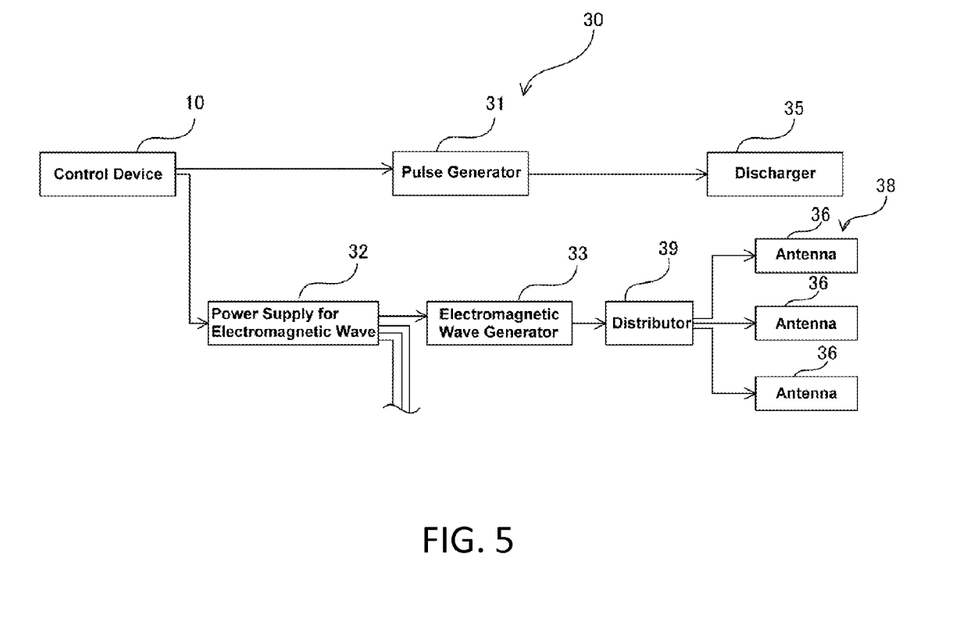
FIG. 5 is a schematic configuration diagram of a plasma generation device according to the second embodiment.

In the plasma generation device 30, the antenna groups 38 are connected to respective electromagnetic wave generators 33. As shown in FIG. 5, in each antenna group 38, a plurality of antennae 36 are connected to each electromagnetic wave generator 33 via a distributor 39. The control device 10 controls the distributor 39 to switch the antenna 36 to be supplied with the microwave generated by the electromagnetic wave generator 33. During the generation period of the microwave plasma, the control device 10 controls the distributor 39 based on an operating condition (such as a condition of the combustion chamber 21) of the internal combustion engine 20 and switches the antenna 36 to be supplied with the microwave, thereby changing the location of the microwave plasma.

The operation of the plasma generation device 30 will be described hereinafter. The plasma generation device 30 performs a plasma generation operation for generating the microwave plasma under control of the control device 10.

In the plasma generation operation, while fuel is injected from each injection hole 55 of the injector 50 for the main injection, the control device 10 outputs a discharge signal to the pulse generator 31 and an electromagnetic wave generation signal to the power supply for electromagnetic wave 32 at the same time. More precisely, the control device 10 outputs the electromagnetic wave generation signal slightly before the discharge signal.

In the power supply for electromagnetic wave 32, upon receiving the electromagnetic wave generation signal, each pulse oscillation part outputs a pulse current for a predetermined time interval (1 ms, for example) at a predetermined duty cycle. Each electromagnetic wave generator 33 outputs to each antenna group 38 a microwave pulse for the predetermined time interval at the predetermined duty cycle. At a point of time to start generating the microwave plasma, the control device 10 controls the distributor 39 so that the innermost antenna 36 from among antennae of each antenna group 38 is supplied with the microwave pulse outputted from each electromagnetic wave generator 33. The innermost antenna 36 from among antennae of each antenna group 38 emits to the combustion chamber 21 the microwave pulse outputted from each electromagnetic wave generator 33.

Meanwhile, the pulse generator 31, upon receiving the discharge signal, outputs a high voltage pulse. The discharger 35, upon receiving the high voltage pulse from the pulse generator 31, causes a spark discharge at the discharge gap.

In the plasma generation operation, a start timing of emitting the microwave pulse to the combustion chamber 21 is before the spark discharge, and an end timing of emitting the microwave pulse to the combustion chamber 21 is after the spark discharge. The spark discharge occurs sometime during the emission period of the microwave pulse. During the emission period of the microwave pulse, a strong electric field, which has relatively strong electric field intensity in the combustion chamber 21, is formed in the vicinity of the innermost antenna 36 from among antennae of each antenna group 38. In the strong electric field in the vicinity of the innermost antenna 36 from among antennae of each antenna group 38, an avalanche-like plasma generation occurs, and comparatively large microwave plasma is generated.

Starting from this state, according to the second embodiment, the control device 10 controls the distributor 39 corresponding to the antenna group 38 to switch the antenna 36 to be supplied with the electromagnetic wave sequentially from inside toward outside from among antennae of the antenna group 38. Then, the strong electric field is moved and accordingly, the microwave plasma is moved from inside toward outside. The microwave plasma is moved toward outside along with the diffusion of the jet flow 56.

Subsequently, when the predetermined time interval has elapsed since the rise time of the electromagnetic wave generation signal, the microwave pulse generation is terminated, and the microwave plasma disappears. The time interval is configured so that the microwave plasma should be maintained until a tail part of the jet flow 56 injected from each injection hole 55 of the injector 50 has passed through the outermost antenna 36 from among antennae of each antenna group 38.

Effect of Second Embodiment

According to the second embodiment, during the generation period of the microwave plasma, the control device 10 changes the location of the microwave plasma by switching the antenna 36 to be supplied with the microwave based on the operating condition of the internal combustion engine 20. Therefore, it is possible to increase the amount of gas (evaporated fuel) brought into contact with the microwave plasma in the combustion chamber 21, and to promote combustion.

Modified Example of Second Embodiment

According to a modified example of the second embodiment, during the generation period of the microwave plasma, the control device 10 changes the number of pieces of the microwave plasma to be brought into contact with the jet flow 56 injected from the injection hole 55 of the injector 50 based on an injection condition (such as injection flow rate and injection pressure) of fuel from the injector 50.

More particularly, in a first condition in which the injection flow rate is low, the control device 10 causes two pieces of the microwave plasma to be brought into contact with each jet flow 56. The control device 10 controls the distributor 39 so that the outermost antenna 36 is supplied with the microwave immediately after the innermost antenna 36 is supplied with the microwave from among antennae of each antenna group 38. On the other hand, in a second condition in which the injection flow rate is higher than that in the first condition, the control device 10 causes three pieces of the microwave plasma to be brought into contact with each jet flow 56. The control device 10 controls the distributor 39 so that the antennae 36 from the innermost antenna 36 to the outermost antenna 36 are sequentially supplied with the microwave one after another from among antennae of each antenna group 38.

Third Embodiment

Figure 6:
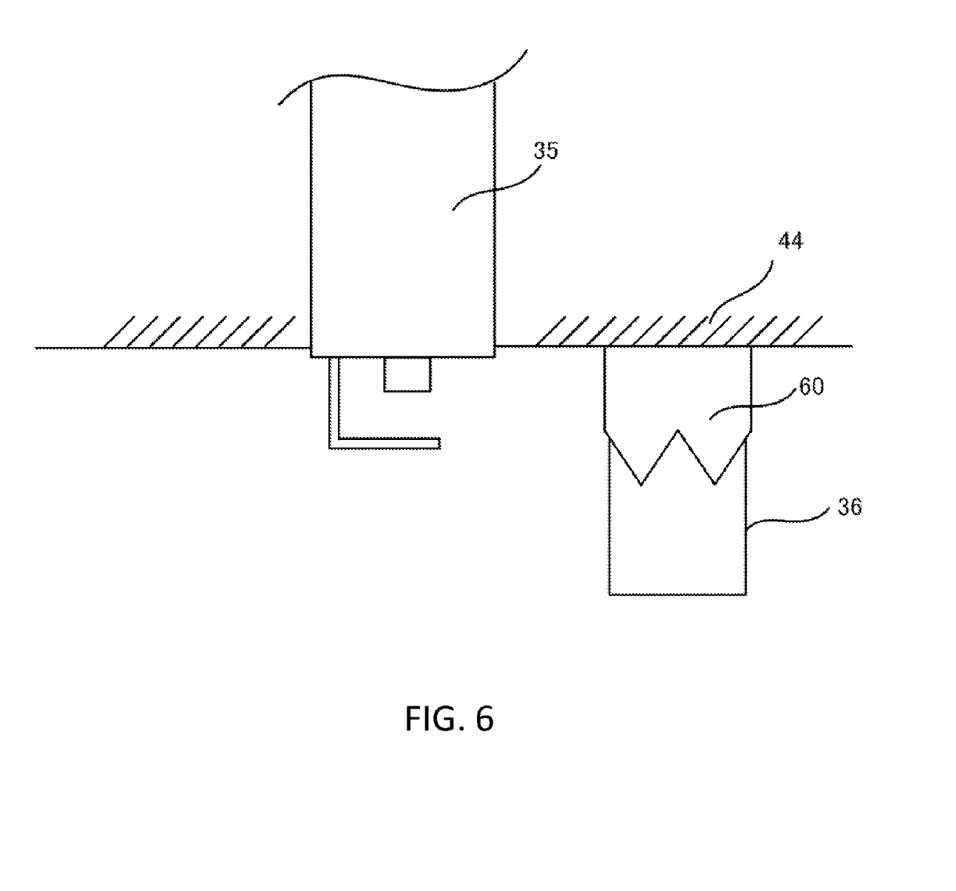
FIG. 6 is a schematic view of an antenna of a plasma generation device according to a third embodiment.

According to a third embodiment, the plasma generation device 30 is provided with an adjustment unit 60 for changing the location of the microwave plasma during the generation period of the microwave plasma by forcibly changing the wavelength of the microwave emitted from the antenna 36. As shown in FIG. 6, the adjustment unit 60 is a covering member 60, which is configured to be variable in shape, and adapted to cover a part of the surface of the antenna 36.

The covering member 60 is a cylindrical member for covering a base part of the antenna 36 that protrudes from the cylinder head 44. A tip end side of the covering member 60 is cut out in a shape of wave. The covering member 60 is configured by, for example, a piezoelectric element. The covering member 60 expands and shrinks in an axial direction of the antenna 36 by switching between a state in which a voltage is applied and a state in which no voltage is applied. For example, the covering member 60 expands when the microwave plasma is maintained after the generation of the microwave plasma. As a result of this, a surface resistance of the antenna 36 is changed and the wavelength of the microwave emitted from the antenna 36 is forcibly changed, thereby changing the location of the strong electric field in the combustion chamber 21. Thus, the microwave plasma moves from a location where the microwave plasma has been initially generated.

The covering member 60 may be bimetal, which changes in shape in accordance with temperature.

Furthermore, the adjustment unit 60 may change impedance of a coaxial line connected to the antenna 36, thereby forcibly changing the wavelength of the microwave emitted from the antenna 36.

Other Embodiments

The above described embodiments may also be configured as follows.

In the embodiments described above, the internal combustion engine 20 may be a gasoline direct injection engine. For each injection hole 55 of the injector 50, the antenna 36 may be provided as in the first embodiment or the antenna group 38 may be provided as in the second embodiment.

Furthermore, according to the first embodiment described above, the internal combustion engine 20 may be a spark ignition gasoline engine. A spark plug is attached at the center of the ceiling surface of the combustion chamber 21. In the combustion chamber 21, fuel air mixture is ignited by, for example, a spark discharge to form a propagation flame, which expands from the ignition location toward outside. The control device 10 generates microwave plasma while the propagation flame is being formed, and controls the stub 37 based on a condition of the propagation flame during the generation period of the microwave plasma. For example, during the generation period of the microwave plasma, the control device 10 changes the electrical length of the stub 37 corresponding to each antenna 36, thereby changing the location of the strong electric field from the inner end toward the outer end of each antenna 36. For example, the control device 10 moves the microwave plasma so that the microwave plasma is brought into contact with a flame zone of the propagation flame.

Furthermore, according to the embodiments described above, in place of the discharger 35, a glow plug for generating thermal electrons in the combustion chamber 21 may be employed. The glow plug may be disposed in a main combustion chamber in the cylinder, or may be disposed in a sub combustion chamber that is held in communication with the main combustion chamber. The plasma generation device 30 generates the microwave plasma by accelerating thermal electrons generated by the glow plug by way of the microwave emitted from the antenna 36.

Furthermore, according to the embodiments described above, microwave plasma may also be generated for injections other than the main injection (i.e., the pre-injection, the pilot injection, the after injection, and the post-injection).

Furthermore, according to the embodiments described above, a plurality of antennae 36 may be disposed on a wall surface of the combustion chamber 21.

Furthermore, according to the embodiments described above, the plasma generation device 30 may not be provided with the discharger 35, but configured to generate the microwave plasma byway of the microwave alone.

Furthermore, according to the embodiments described above, during the transient operation, the microwave outputted from the electromagnetic wave generator 33 may be increased in the amount of energy in comparison with that during the normal operation, thereby increasing the intensity of the microwave plasma. Furthermore, the intensity of the microwave plasma may be changed in accordance with the amount of produced soluble organic matter. Furthermore, the number of pieces of microwave plasma generated during the transient operation may be increased in comparison with that during the normal operation.

INDUSTRIAL APPLICABILITY

The present invention is useful in relation to a plasma generation device that generates electromagnetic wave plasma by emitting electromagnetic waves to a combustion chamber of an internal combustion engine.

EXPLANATION OF REFERENCE NUMERALS

10 Control Device (Control Unit)
20 Internal Combustion Engine
21 Combustion Chamber
30 Plasma Generation Device
33 Electromagnetic Wave Generator
36 Antenna
37 Stub (Adjustment Unit)
50 Injector
55 Injection Hole
56 Jet Flow

What is claimed is:

1. A plasma generation device, comprising:
an electromagnetic wave generator that generates electromagnetic waves to be emitted to a combustion chamber of an internal combustion engine;
an antenna for emitting the electromagnetic wave supplied from the electromagnetic wave generator to the combustion chamber; and
a control unit that controls the electromagnetic wave generator based on an operating condition of the internal combustion engine, and generates electromagnetic wave plasma by the electromagnetic wave emitted to the combustion chamber from the antenna, wherein
the antenna extends along a ceiling surface or a wall surface of the combustion chamber, and includes an adjustment unit that changes a location of a strong electric field, a strong electric field intensity, on a surface of the antenna, which is supplied with the electromagnetic wave, and
the control unit changes a location of the electromagnetic wave plasma by controlling the adjustment unit during a generation period of the electromagnetic wave plasma.

2. The plasma generation device according to claim 1, wherein
the internal combustion engine includes an injector that injects fuel to the combustion chamber, and
the control unit generates the electromagnetic wave plasma at a time of injection of fuel from the injector and controls the adjustment unit based on a diffusion condition of a jet flow injected from the injector during the generation period of the electromagnetic wave plasma.

3. The plasma generation device according to claim 1, wherein
fuel air mixture is forcibly ignited and a propagation flame is formed in the combustion chamber of the internal combustion engine,
and the control unit generates the electromagnetic wave plasma while the propagation flame is being formed and controls the adjustment unit based on a condition of the propagation flame during the generation period of the electromagnetic wave plasma.

4. The plasma generation device according to claim 2, wherein
the control unit causes to change an amount of energy of the electromagnetic wave outputted from the electromagnetic wave generator in response to a change of injection quantity of fuel from the injector during a transient operation of the internal combustion engine.

5. The plasma generation device according to claim 1, wherein
the plasma generation device moves the plasma in a direction opposite to a direction of a gas flow in the combustion chamber during the generation period of the electromagnetic wave plasma.

6. The plasma generation device according to claim 1, comprising:
an electron discharge unit that forcibly causes a discharge of free electrons in the combustion chamber, wherein
the antenna emits electromagnetic waves while the discharge of free electrons is being forcibly caused by the electron discharge unit, thereby generating the electromagnetic wave plasma.

7. A plasma generation device, comprising:
an electromagnetic wave generator that generates electromagnetic waves to be emitted to a combustion chamber of an internal combustion engine;
an antenna for emitting the electromagnetic wave supplied from the electromagnetic wave generator to the combustion chamber; and
a control unit that controls the electromagnetic wave generator based on an operating condition of the internal combustion engine, and generates electromagnetic wave plasma by way of the electromagnetic wave emitted to the combustion chamber from the antenna, wherein
a plurality of the antennae are provided on a ceiling surface or a wall surface of the combustion chamber, and
the control unit changes a location of the electromagnetic wave plasma by switching the antenna to be supplied with the electromagnetic wave during a generation period of the electromagnetic wave plasma.

8. The plasma generation device according to claim 7, wherein
the internal combustion engine includes an injector that injects fuel to the combustion chamber, and
the plurality of antennae are arrayed along an injection direction of fuel from an injection hole of the injector.

9. The plasma generation device according to claim 8, wherein a swirl is formed in the combustion chamber, and the plurality of antennae are arrayed at locations each displaced in a direction of the swirl from a line extending straightforward in an injection direction from an injection hole of the injector.

10. The plasma generation device according to claim 8, wherein the control unit changes the number of pieces of the electromagnetic wave plasma to be brought into contact with a jet flow injected from the injection hole based on an injection condition of fuel from the injector during the generation period of the electromagnetic wave plasma.

11. The plasma generation device according to claim 8, wherein the control unit causes to change an amount of energy of the electromagnetic wave outputted from the electromagnetic wave generator in response to a change of injection quantity of fuel from the injector during a transient operation of the internal combustion engine.

12. A plasma generation device, comprising:

an electromagnetic wave generator that generates electromagnetic waves to be emitted to a combustion chamber of an internal combustion engine;

an antenna for emitting the electromagnetic wave supplied from the electromagnetic wave generator to the combustion chamber; and a control unit that controls the electromagnetic wave generator based on an operating condition of the internal combustion engine, and generates electromagnetic wave plasma by way of the electromagnetic wave emitted to the combustion chamber from the antenna, wherein the antenna includes an adjustment unit that changes a location of the electromagnetic wave plasma during a generation period of the electromagnetic wave plasma by forcibly changing a wavelength of the electromagnetic wave emitted from the antenna.

13. The plasma generation device according to claim 12, wherein the adjustment unit is configured to be variable in shape, and is a covering member that covers a part of a surface of the antenna, and the plasma generation device changes a surface resistance of the antenna by changing a shape of the covering member during the generation period of the electromagnetic wave plasma, thereby forcibly changing a wavelength of the electromagnetic wave emitted from the antenna.

\* \* \* \* \*